E. O. SCHWEITZER.
INSTANTANEOUS VOLTAGE REGULATING MEANS.
APPLICATION FILED MAY 9, 1917.

1,309,814.

Patented July 15, 1919.
9 SHEETS—SHEET 1.

Witnesses
Charles V. Hildebrecht
John A. Dienner

Inventor
Edmund O. Schweitzer
By Brown, Hanson & Boettcher
Attorneys

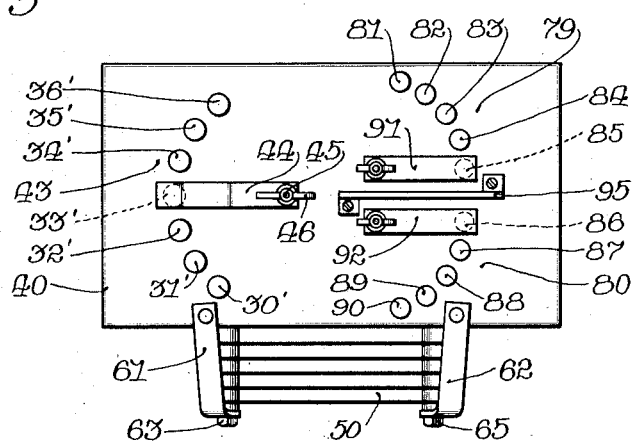
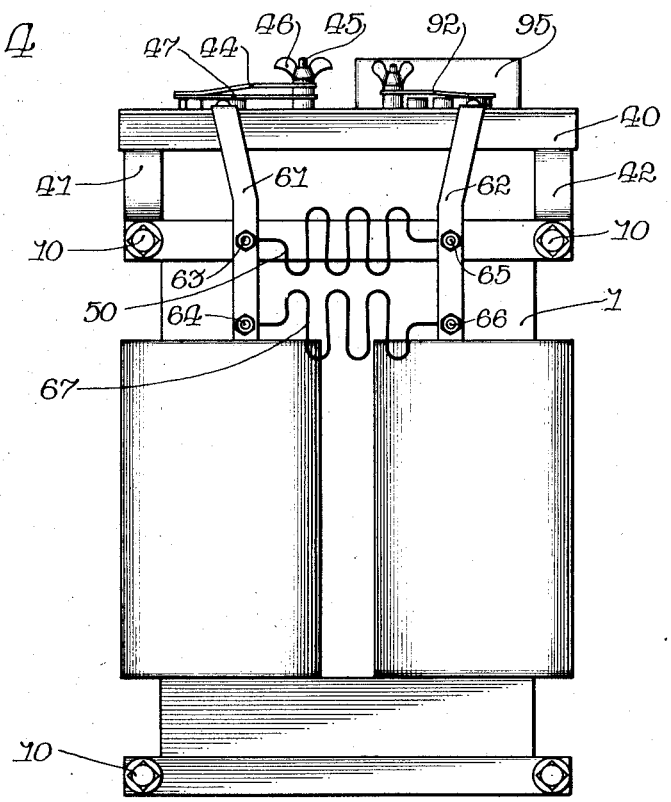

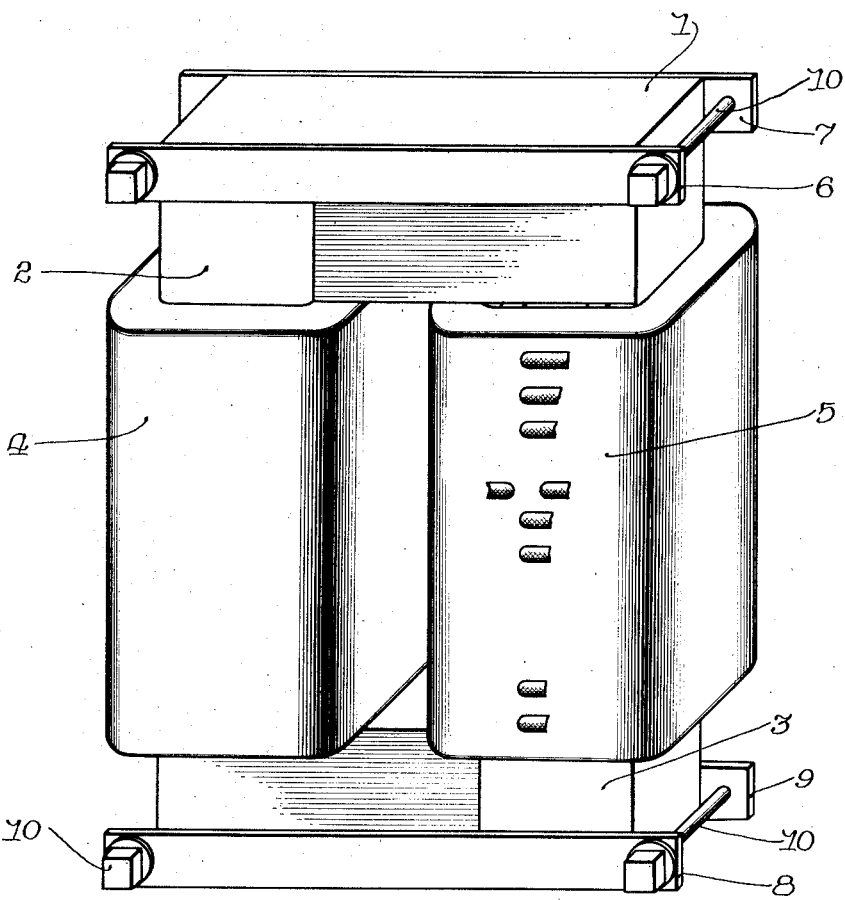

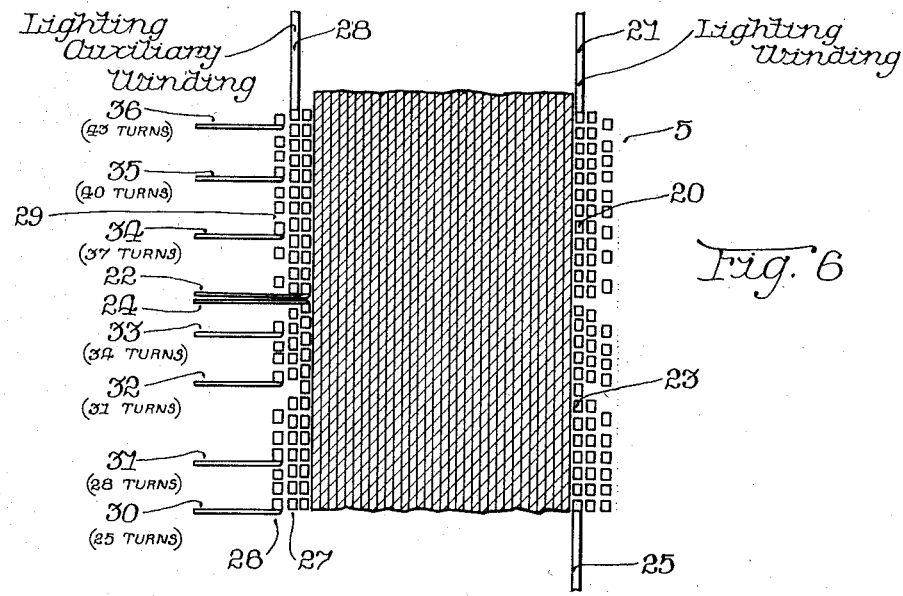
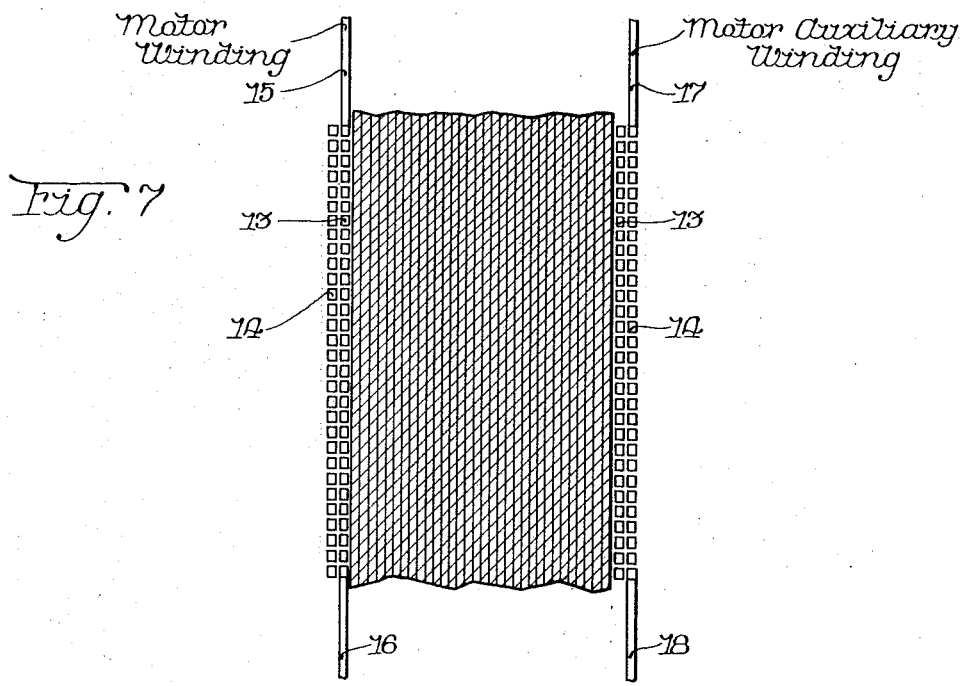

E. O. SCHWEITZER.
INSTANTANEOUS VOLTAGE REGULATING MEANS.
APPLICATION FILED MAY 9, 1917.
1,309,814.
Patented July 15, 1919.
9 SHEETS—SHEET 5.
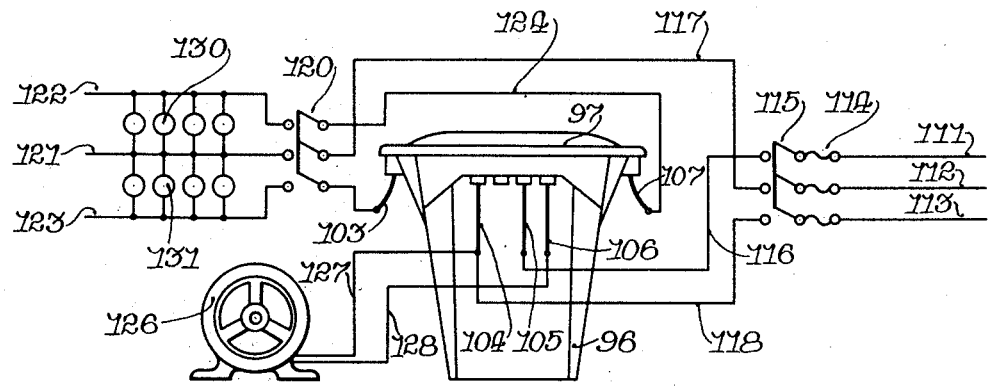
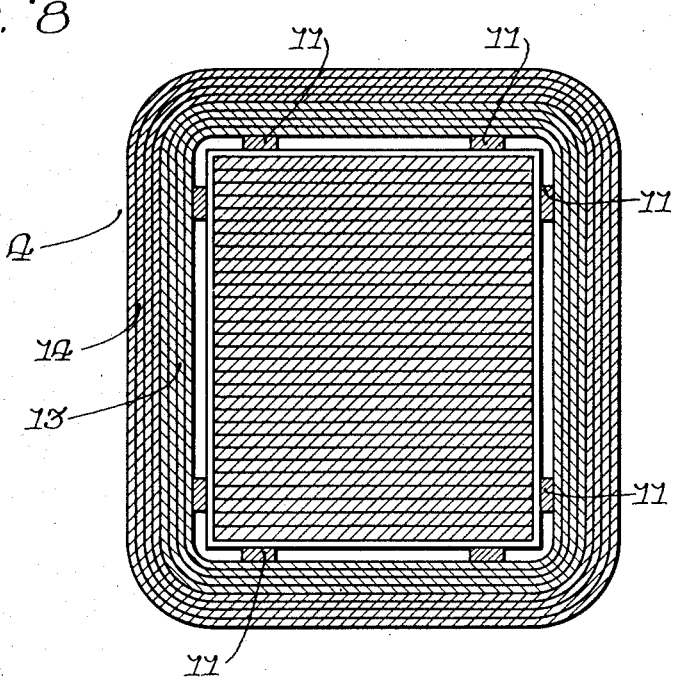

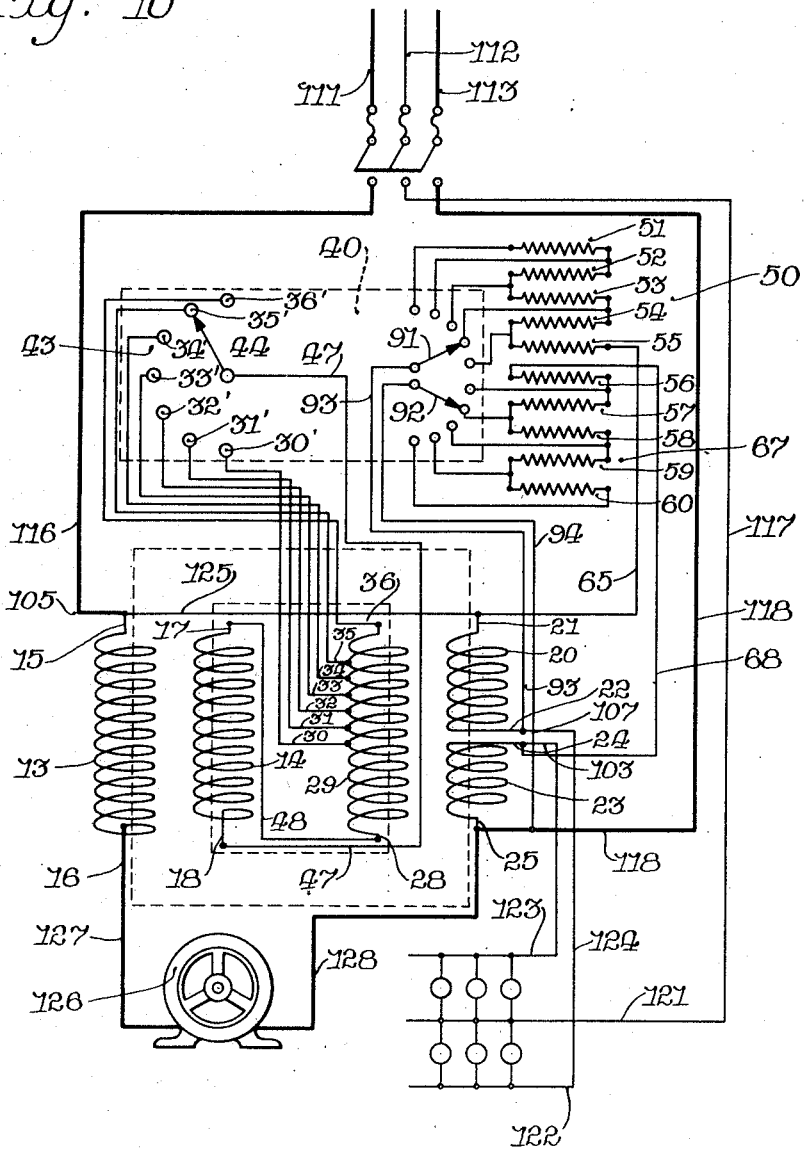

E. O. SCHWEITZER.
INSTANTANEOUS VOLTAGE REGULATING MEANS.
APPLICATION FILED MAY 9, 1917.

1,309,814.

Patented July 15, 1919.
9 SHEETS—SHEET 7.

Witnesses
Charles V. Hildebrecht
Jenn A Diener

Inventor
Edmund O. Schweitzer
By Brown, Hanson & Boettcher
Attorneys

E. O. SCHWEITZER.
INSTANTANEOUS VOLTAGE REGULATING MEANS.
APPLICATION FILED MAY 9, 1917.
1,309,814.
Patented July 15, 1919.
9 SHEETS—SHEET 8.
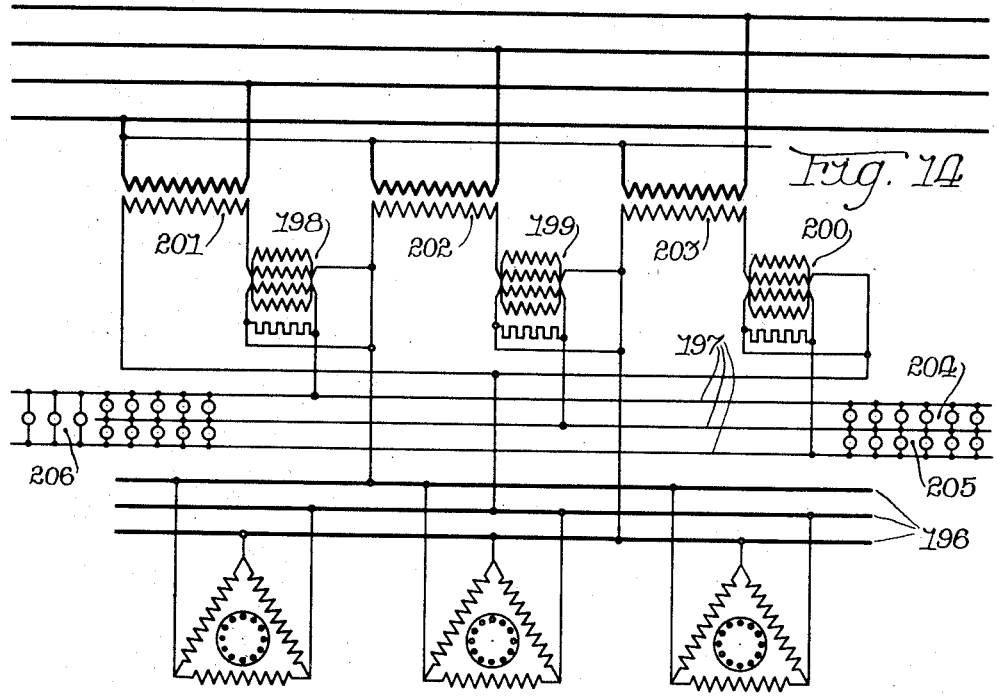
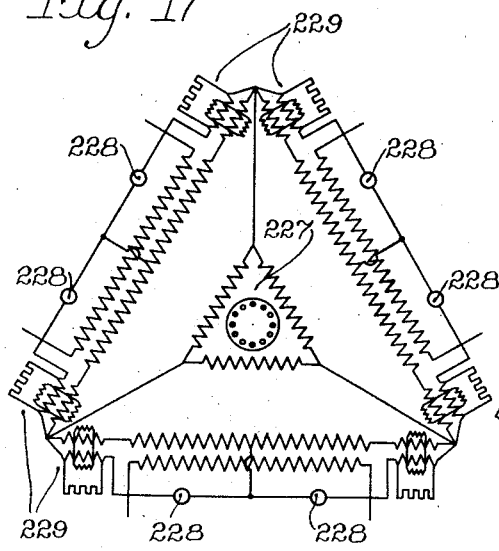
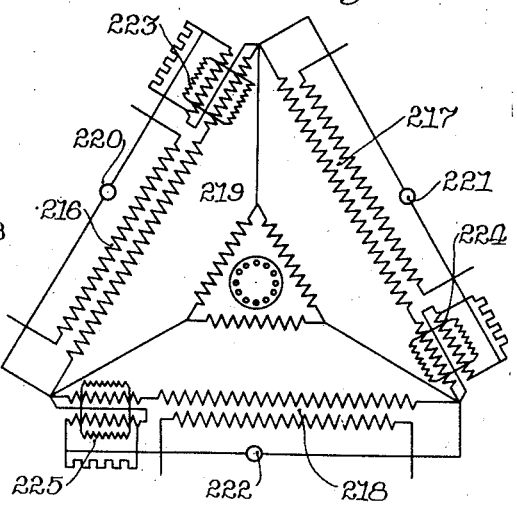
Witnesses
Charles V. Hildebrecht
John A. Dienner
Inventor
Edmund O. Schweitzer
By Brown, Hanson & Boettcher
Attorneys

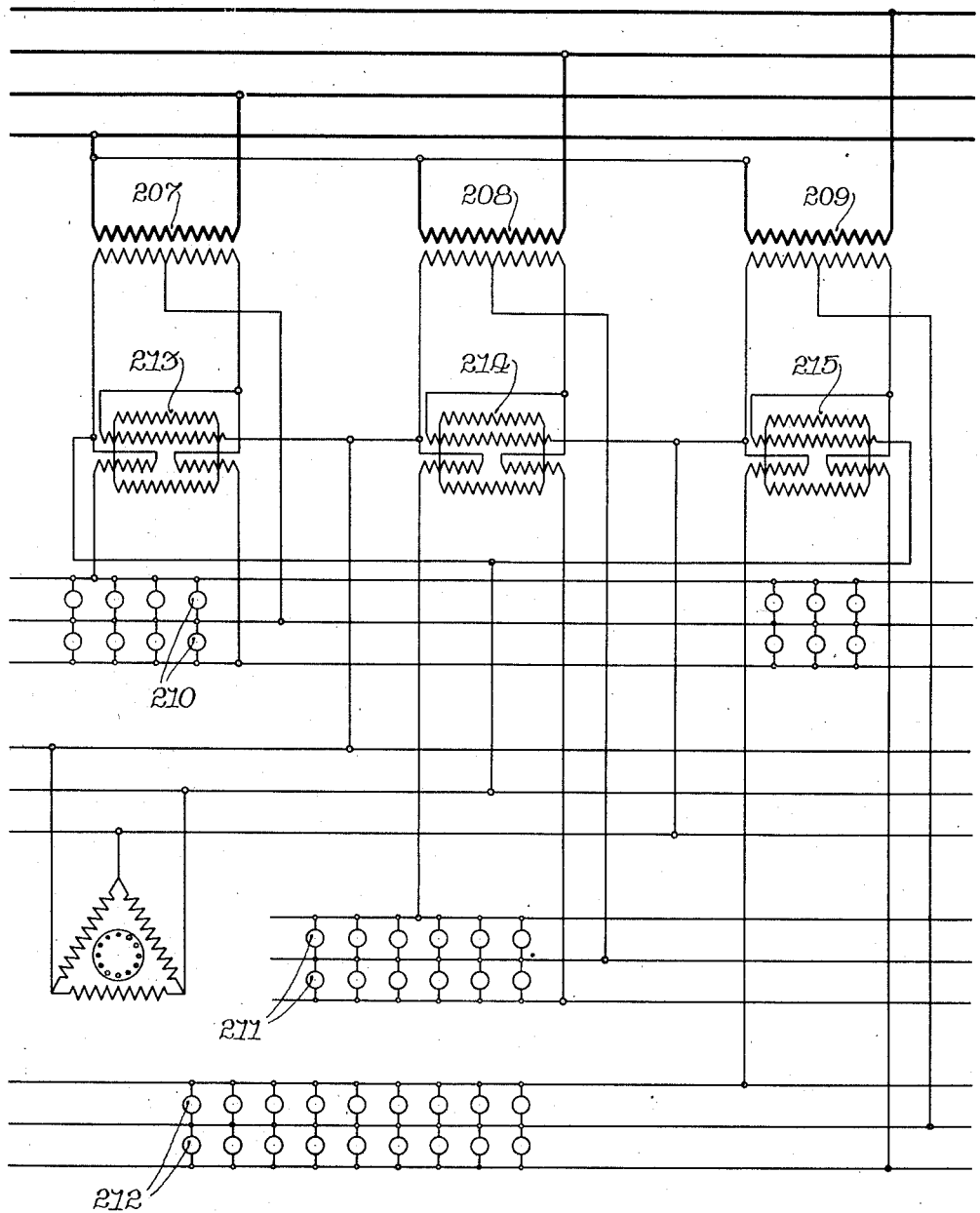

UNITED STATES PATENT OFFICE.

EDMUND O. SCHWEITZER, OF CHICAGO, ILLINOIS.

INSTANTANEOUS-VOLTAGE-REGULATING MEANS.

1,309,814.           Specification of Letters Patent.     Patented July 15, 1919.

Application filed May 9, 1917. Serial No. 167,390.

*To all whom it may concern:*

Be it known that I, EDMUND O. SCHWEITZER, a citizen of the United States, residing at Chicago, in the county of Cook and State of Illinois, have invented a certain new and useful Improvement in Instantaneous-Voltage-Regulating Means, of which the following is a full, clear, concise, and exact description, reference being had to the accompanying drawings, forming a part of this specification.

My invention relates to instantaneous voltage regulating means.

In my prior patents, Nos. 1,162,405 and 1,184,266, granted to me on November 30, 1915, and May 23, 1916, respectively, I have explained the general principle of means invented by me for compensating the voltage of one branch of a feeder circuit at the expense of another branch when said other branch causes a disturbance by drawing a larger current. My present invention relates to certain improvements in apparatus and circuits over the devices disclosed in my prior patents.

The general problem of my invention may be illustrated by an installation such as follows. A single transformer is connected between the distribution mains on one hand and the consumption circuits of a consumer on the other. The consumption circuits comprise incandescent lamps used for illumination purposes and a motor employed for furnishing power on the premises. Such installation without means for compensating the lamp voltage for the drop which would be caused by the heavy draft of current upon starting the motor or loading the same would not be practicable commercially.

It is desirable, however, to feed all the circuits of the consumer from the same service transformer to avoid an extra transformer, extra meters, switches and wire.

My present invention provides specifically an improved construction for the regulator and teaches the desirable relations and proportions to be observed. The invention further provides a system of distribution for supplying lamps with current by means of three wire distribution circuits, and compensating the voltage on the lamps for the current drawn by a higher voltage motor circuit. The invention also provides a system for compensating the voltage of the lamps which are supplied with current from a multi-phase system where a multi-phase motor is fed from the same transformer bank. Other and further specific improvements will be apparent from the following specification.

In the accompanying drawings I have illustrated apparatus and circuits embodying my invention.

Fig. 3 is a top plan view of the interior of th regulator showing the terminal board and the resistances;

Fig. 4 is a front elevational view of the same;

Fig. 5 is an isometric view of the core of the regulator with the windings in place;

Fig. 6 is a cross-sectional view of the core and windings for the lighting side of the regulator;

Fig. 7 is a similar cross-sectional view of the core and windings for the motor side of the regulator;

Fig. 8 is a horizontal cross section of one of the cores showing the manner of placing the windings;

Fig. 9 is an external circuit diagram for a three-wire system;

Fig. 10 is an internal diagram of the regulator showing also the manner of attaching the external connections;

Fig. 14 is a circuit diagram showing three phase high voltage mains connected by a bank of transformers to low voltage motor mains and low voltage lamp mains, the lamps being connected across a plurality of the phases of the system;

Fig. 15 shows diagrammatically a similar system in which three phase transmission mains operating through a single bank of transformers are connected to motor mains and each phase is connected to a lighting load by a three-wire system;

Fig. 16 is a diagram of a system similar to that of Fig. 14 except that the transformers are connected in delta; and Fig. 17 is a diagram of a system similar to that of Fig. 15 except that the transformers are connected in delta.

Figure 1:
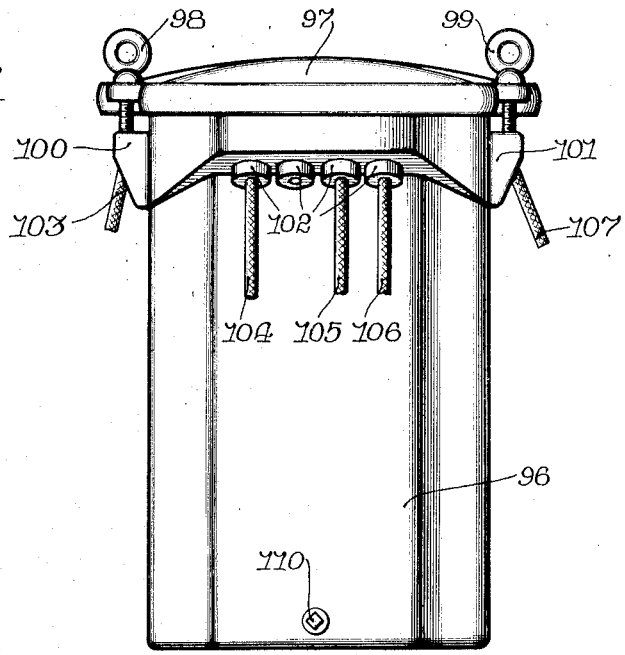
Figure 1 is a front elevation of the regulator inclosed within the shell showing the projecting leads.

I shall first describe the mechanical structure of the regulator and shall then with the aid of the diagrams explain the manner of use of the same in various systems.

The regulator comprises a core 1 of silicon steel built up of laminations or strips as is understood in transformer practice, to form the core 1 shown in Fig. 5. Upon the vertical limbs 2 and 3 of this core are placed the motor coil and the lamp coil 4 and 5 respectively.

The laminations of the core are held together by means of the clamping bars 6—7 and 8—9 at the top and bottom of the core respectively. Suitable bolts 10 at the ends of the clamping bars hold the same together.

The coils 4 and 5 are rectangular in outline as shown in Fig. 8, filling substantially the full length of the legs 2 or 3 and being held upon the same with wood or fiber strips 11 lying between the coil and core as shown in Fig. 8.

Each of the coils 4 and 5 comprises more than one winding. The motor coil 4 comprises two windings, the motor winding 13 and the motor auxiliary winding 14, the auxiliary winding being wound upon the outside of the main winding. All of the windings on the core 1 are of square copper conductor 204 by 204 mils d. c. c. Both the motor main winding and the motor auxiliary winding consist of 25 turns lying in a single layer with the auxiliary winding 14 wound upon the outside of the main winding 13. The main winding 13 terminates in the leads 15 and 16 and the auxiliary winding terminates in the leads 17 and 18.

The lighting coil consists of three windings, two of these consisting of 12½ turns each are wound into a single continuous layer with taps taken out at the proper points to form terminals. These windings are next to the core and are called the lighting windings. The upper lighting winding 20 has an upper terminal 21 and a lower terminal 22. The lower lighting winding 23 has an upper terminal 24 and a lower terminal 25, as shown in Fig. 6. The lighting auxiliary winding is wound on top of the lighting windings 20—23, and consists of two layers 26 and 27. The total number of turns in the lighting auxiliary winding is 43. The first layer 27 has its terminal 28 at the top of the core and this layer is wound as nearly as possible turn for turn upon the lighting windings 20—23. The second layer 26 is distributed as nearly as possible along the length of the core. The tap 30 is brought out at substantially 25 turns from the terminal 28. Suitable taps 31, 32, 33, 34, 35, and 36 are then led out for every three additional turns to include the total of 43 turns at the terminal 36.

A suitable terminal board 40 is mounted upon brackets 41 and 42, which in turn are connected by means of the bolts 10 through the clamping bars 6 and 7 to the core 1. The terminal board 40 supports a series of terminals 43 which are successively numbered 30' to 36' and which are connected respectively to the taps 30 to 36 inclusive. A movable contacting finger 44 is pivoted on the post 45 and is adapted to make contact with any one of the terminals 43. A suitable clamping nut 46 in the shape of a wing nut provides means for clamping the contacting finger 44 in engagement with the desired one of the terminals 43. This contacting finger 44 is connected by wire 47 to the terminal 18 of the motor auxiliary coil. The terminal 17 of the motor auxiliary coil is connected by wire 48 to the terminal 28 of the lighting auxiliary winding.

It can now be seen that the lighting auxiliary winding and the motor auxiliary winding 29 and 14 respectively are connected in opposition to each other. The switch consisting of the contactor 44 and the terminals 43 is adapted to vary the number of turns connected in the auxiliary lamp winding.

A variable resistance shunt 50 consisting of ten sections of non-inductive resistance numbered 51 to 60 is suspended by means of a pair of brackets 61 and 62 that are secured at their upper ends to the terminal board 40. The various sections of the shunt 50 have their ends supported upon the posts 63, 64, 65, and 66, from which these sections are insulated by suitable sleeves and collars as is well understood in the art. The sections 51 to 55 inclusive are all connected in series and one end of the series connection is joined by the wire 65 to the terminal 21 of the coil 20. In a similar manner the sections 56 to 60 inclusive are connected together in series with one end of the series connection joined by the wire 68 to the terminal 24 of the lamp coil 23.

The terminal board 40 is provided with two groups of contact sets 79 and 80, the first group comprising the contact points 81 to 85 inclusive. These contacts are connected by suitable wires to taps taken out from the series connection. An adjustable contact finger 91 is adapted to make contact with the desired terminal of the group in order to include more or less resistance. The contact 91 is connected by wire 93 to the terminal 22 of the lamp coil 20.

In a similar manner, suitable wires connect the contact points 86 to 90 inclusive to taps taken off from the sections of the shunt 67. A contacting finger 92 is adapted to make connection with the desired terminal of the group, this contact finger being connected by a wire 94 to the terminal 25 of the lamp coil 23. In Figs. 3 and 4 these leads and terminals have been omitted for the sake of clearness. The contact fingers 91 and 92 are adjustable in any position desired and may be clamped in place as described in connection with the contact finger 44 above. A barrier or stop member 95 separates the two groups of contacts 79 and 80 and separates also the contact members 91 and 92.

Figure 2:
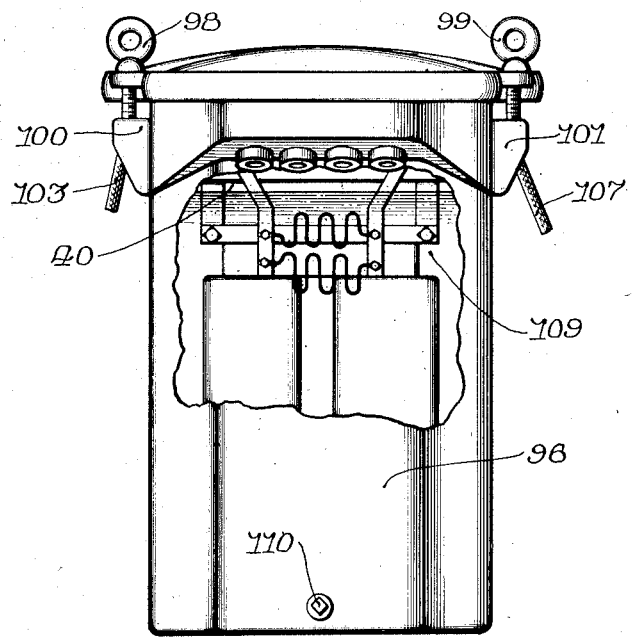
Fig. 2 is a similar front elevation having parts broken away to indicate the position of the interior structure in the bath of oil.

The structure thus far described is inclosed within a suitable shell 96 similar to a transformer shell having a removable cover 97 which is secured by the eye bolts 98 and 99 to suitable lugs 100 and 101. The shell 96 is provided with suitable bushings such as shown at 102, through which the various leads 103, 104, 105, 106, and 107, lead from the interior of the case to the exterior thereof. The case 96 is substantially filled with transformer oil as is shown at 109 in Fig. 2, this body of oil serving two purposes, namely, as an insulating medium for the coils and as a cooling medium for the resistance shunt. The terminal board may easily be exposed for proper setting by removing the cover 97 and after the regulator is once installed and set no further attention needs to be given to it. An opening in the bottom of the case 96 is closed by the screw-plug 110 which permits the oil to be drained off if desired.

The external connections of the regulator above described are more clearly shown in Fig. 9 of the drawings. The service wires 111, 112, and 113 are connected through the fuses 114 and the cut-out or switch 115 to the wires 116, 117, and 118 respectively. The wire 116 is connected to the lead 105, which in turn is connected to the terminal 15 to one end of the motor winding 13. The wire 117 is the neutral wire and is connected through the switch 120 to the neutral wire of the three wire lamp main. The wire 118 is connected to the lead 104 and through the terminal 25 to the lamp winding 23. The other terminal 24 of the lamp winding 23 is connected through the lead 103, switch 120, to the lamp main 123. The other lamp winding 20 is connected through the terminal 22, lead 107 by a wire 124 to the main 122. The opposite terminal 21 of the lamp winding 20 is joined by a wire 125 within the shell of the regulator to the lead 105 and then through the wire 116 to the service wire 111.

The voltage between the neutral 121 and the outer wires 122 and 123 is maintained at substantially 110 volts.

The motor 126 which in this case is a single phase motor, is connected by the leads 127 and 128 through a suitable switch not shown to the regulator leads 104 and 106.

It will now be apparent, from the above disclosure, that the lamps 130 and 131 and the motor 126 are connected to the same service leads 111, 112 and 113. The motor may be started without causing flickering of the lamps 130 and 131. It will be noted that the motor auxiliary coil 14 and the lamp auxiliary coil, or a part of the same, are connected in opposition to each other. The ratio between the motor coil and the sum of the lamp coils 20 and 23 is as 1 to 1. The ratio between the motor auxiliary coil 14 and the lamp auxiliary coil 29 lies between a 1 to 1 ratio and a 25 to 43 ratio.

The function of this closed circuit which is formed by the two auxiliary windings connected together in opposition is in effect to permit a change to be made in the mutual inductance between the two windings without a corresponding change in the self induction of the respective windings or vice versa, for the purpose of obtaining the proper boosting effect on the lamp main. In analyzing the effect of the closed circuit comprising the auxiliary windings, consider that a certain amount of current is flowing in these windings in series, it can be seen that the effect of the lamp auxiliary winding upon the lamp coil will be greater than the effect of the auxiliary motor winding upon the motor coil for the same amount of current. This is due to the fact that there are more turns in the lamp auxiliary winding than in the motor auxiliary winding. As the coils are in series the current flowing will cause a greater magnetomotive force due to the greater number of ampere turns in the lamp auxiliary coil.

The resistance shunt, various parts of which are connected across the individual lamp coils, serves a double function. First, it reduces the impedance drop in the main lighting coil or coils and thereby tends to maintain a better regulation when the lighting load changes. It also serves as additional means for adjusting the amount of compensation of the voltage in the lamp circuit.

It will be apparent that in order to compensate properly the lamp circuit for the drop in voltage which would occur upon starting the motor, two features must be taken into reckoning, namely, the resistance of the circuit or circuits which cause the resistance drop and the inductance of the circuit or circuits which cause an inductance drop. A compensation for only the resistance drop would be inadequate and a compensation for the inductance drop only would also be inadequate. The provision of the adjustable auxiliary lamp winding and of the adjustable resistance shunt across the lamp winding enable me to provide the proper compensation for both factors. In other words, these two adjustments enable me to secure the proper numerical value of the quantity $\frac{L}{R}$ and also to maintain it of the correct algebraic sign.

The above embodiment has been described particularly with reference to a three-wire installation because this is the most common condition to be met. Most public service companies will permit motors of only a very small capacity to be connected to the 110-volt main. Above a certain limited capacity, the motor must be connected to 220—230 volt mains for operation. As incandescent lamps are very generally, and almost exclusively, employed on 110—115 volt service, the regulator above described has been particularly designed to meet this requirement.

It is a well known fact that three-phase transmission is more economical than single phase transmission and as a consequence I have devised circuit arrangements to meet this condition.

Figure 11:
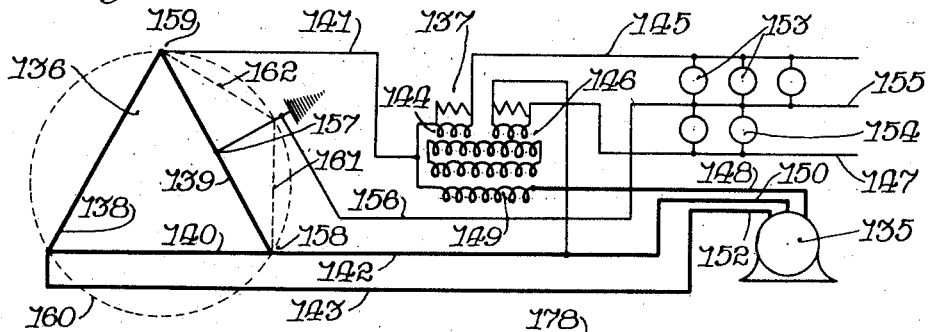
Figs. 11, 12 and 13 illustrate the manner in which the regulator is applied in different forms of three phase distribution.

In Fig. 11 I have shown a system employing three phase distribution and operating a three phase motor 135 from the transformer bank 136 which is connected in delta with 230 bolts per phase. The regulator 137 shown in Fig. 11 is of the specific construction shown in the previous figures.

The bank of transformers 136 consists of the three individual transformers 138, 139 and 140 connected in delta to the three service mains 141, 142 and 143. The service main 141 is connected in series with the lamp coil 144 of the regulator 137 and in series with the same to the lamp main 145. The service main 142 is connected in series with the other lamp coil 146 to the outer lamp main 147. Thus, it can be seen that the lamp mains 145 and 147 are connected in series with the lamp coils 144 and 146 across the phase 139 of the transformer bank. The three phase motor 135 which is connected across all three phases has one lead thereof 148 connected in series with the motor coil 149 to the service lead 141. The motor leads 150 and 152 are connected respectively to the service leads 142 and 143. Thus it can be seen that the three phase motor 145 is operated on three phase power at substantially 230 volts per phase. The voltage between the lamp mains 145 and 147 is also substantially 230 volts and in order to adapt the ordinary incandescent lamp to be operated on this circuit, a neutral lamp wire 155 is connected by a service lead 156 to the middle point 157 of the transformer 139, the point being also grounded. The voltage to which the lamps 153 and 154 are then subject is substantially 115 volts.

It will be appreciated by those skilled in the art that the neutral point 157 will be in phase with the point 158 so far as the lamps 154 are concerned, and it will also be in phase with the point 159 so far as the lamps 153 and 154 are concerned, but will be substantially out of phase with the two points considered together. The reason for this is indicated by the dotted circle 160 and the chords 161 and 162. This is at once apparent when it is considered that the power factor of the entire winding of the transformer is different from that of half of the winding.

It is thus apparent from Fig. 11 that I am able to operate a 220—230 volt motor from a three-phase bank of transformers and operate the ordinary 110 to 115 volt incandescent lamps from one phase of the power bank.

Figure 12:
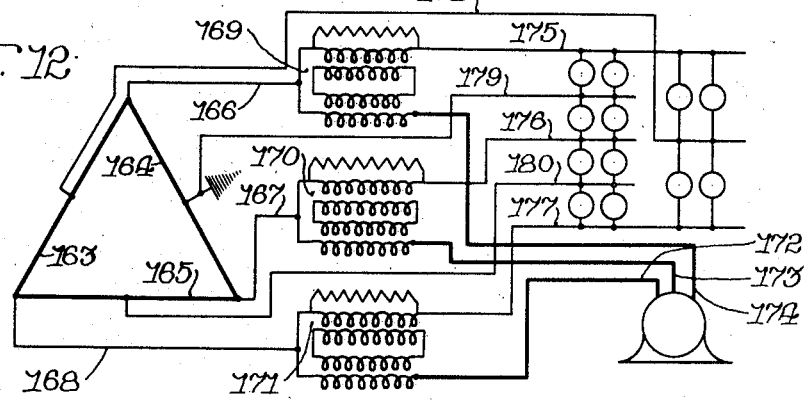

In Fig. 12 I have illustrated diagrammatically a system in which it is possible to operate a three-phase 230 volt motor from a delta connected bank of three-phase transformers and to operate three groups of 110—115 volt incandescent lamps from all three phases. The bank of transformers comprises the three windings 163, 164 and 165 connected together in delta with service mains 166, 167 and 168 connected to the terminals of the transformers in series through the regulators 169, 170 and 171 to the motor leads 172, 173 and 174 and to the lamp leads 175, 176 and 177. Wires 178, 179 and 180 are connected to the central points of the transformer windings 163, 164 and 165 of the power bank so that the lamps are divided into three groups, one for each phase, operating upon the principle of three-wire distribution. The regulators 169, 170 and 171 are similar to the construction described in connection with Figs. 1 to 10 inclusive, with the exception that instead of having two separate lamp coils, the lamp coils are all connected in series.

Figure 13:
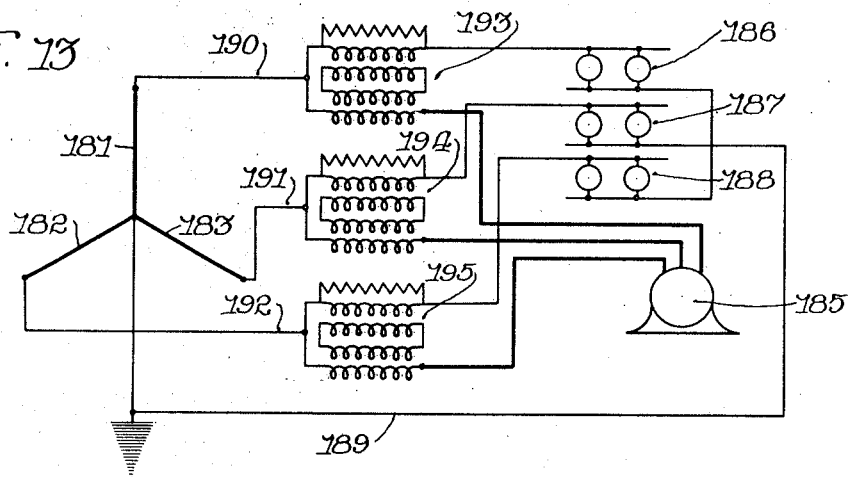

In Fig. 13 I have illustrated the manner in which a three phase motor 185 operating on 208 volts is connected to a three phase bank of transformers connected in star, which bank of transformers also supplies the three groups of lamps 186, 187 and 188.

Each of the phases 181 and 182 individually operates on 120 volts and the lamps 186, 187 and 188 are fed from the individual phases through the connection of the neutral wire 189 which serves as a common return for the individual phases. The service leads 190, 191 and 192 are connected to the outer ends of the transformer windings 181, 182 and 183 and the motor 185 has its mains connected in series with the motor windings of the regulators 193, 194 and 195. These regulators have lamp windings in series with the lamps 186, 187 and 188. The construction of the regulators 193, 194 and 195 is substantially the same as that described in connection with Figs. 1 to 10 inclusive, the lamp coils being in series as explained in connection with Fig. 12.

Fig. 14 shows a three phase star to delta connected system in which the motor mains 196 are maintained at substantially the same voltage as the lamp mains 197. The motor mains 196 are connected in series through the motor coils of the regulators 198, 199 and 200 to the transformers 201, 202 and 203. The lamps 204 and 205 are shown as connected between only two phases but it is apparent that lamps could also be connected on the other phases, as shown at 206. The construction of the regulators 198, 199 and 200 is substantially the same as shown in connection with Figs. 1 to 10, except that the lamp coils are connected in series.

Fig. 15 shows a similar system in which, however, the terminals of the delta connections of the secondary of the star to delta connected transformers 207, 208 and 209 give substantially 220 volts and three groups of lamps 210, 211 and 212 are operated on the three wire system with a neutral tap from the secondary of the transformer to the corresponding middle wire of the group of lamps. The regulators 213, 214 and 215 are similar in structure to the specific structure disclosed in Figs. 1 to 10 inclusive. The two lamp coils are connected in series with each of the terminal wires from the secondary of the corresponding power transformer such as 207.

Fig. 16 is a diagram of a system employing a delta connection for the transformers 216, 217 and 218, the motor 219 and the lamps 220, 221 and 222 being operated upon substantially the same voltage. In this construction, the three regulators 223, 224 and 225 are connected with their motor windings in series between the terminal of the transformer and the corresponding connection with the other transformer. In this manner only three regulators are necessary where the lamps and the motors are operated at the same voltage on a delta connected transformer bank.

This diagram of Fig. 16 is therefore analogous to the diagram of Fig. 14, Fig. 14 showing the connection for a star connected bank of transformers having the same voltage on the lamps as on the motors.

Fig. 17 is a delta connected system operating with 220 volts upon the motor 227 and with the lamps 228 operating on 110 volts in a three wire system on each phase. In this system the six regulators 229 are employed so that each lamp circuit may have an individual lamp winding in series with its individual wire. The construction of the regulators in Figs. 16 and 17 employs the lamp windings in series.

It will be apparent from the above diagram that the regulator of my invention is adaptable to commercial installations operating on three phase distribution from a power bank either connected in delta or in Y with lamp voltage across each phase or with double lamp voltage across each phase feeding the lamps and the motors either at the same voltage or the lamps at one half of the motor voltage as required.

While I have described my invention with reference to the details of a particular embodiment, it is to be understood that I do not intend thereby to limit the invention except as such limitations are imposed by the appended claims.

What I claim is:

1. In combination, a three-phase supply circuit comprising three transformer windings, a group of lamps operated from a single phase of said supply circuit, a three-phase motor connected to said supply circuit, and regulating means having windings in series with said motor and said lamps for compensating the voltage impressed on said lamps in accordance with current drawn by said motor.

2. In combination, a three-phase supply circuit, a three-wire single phase distribution system for supplying incandescent lamps with current, a three-phase motor connected to said supply circuit and regulating means having windings in each of the outer wires of the three-wire system, said regulating means having windings in series with said motor, said regulating means causing compensation in the voltage of the three-wire system when current is drawn by the three-phase motor.

3. In combination, a three-phase supply circuit, a three-wire single phase distribution system connected to one of the phases of the supply circuit, a three-phase motor connected to said three-phase supply circuit, a plurality of lamps connected between the outer wires and the neutral wire, and a regulator having a winding in series with the outer wires of the three-wire system and having a winding in series with said motor, said regulator windings being related to each other for maintaining a constant voltage upon the lamps in spite of current drawn by the motor.

4. In combination, a service transformer, a series of incandescent lamps of the order of 110—115 volts connected in multiple to said transformer, a motor of the order of 220—230 volts connected to said transformer, a regulator having a winding in series relation with the lamps, a winding in series relation with the motor, and a closed regulating circuit serially related to said lamp winding and to said motor winding.

5. In combination, a service transformer, a series of multiple incandescent lamps of the order of 110—115 volts connected to said transformer, a motor of the order of 220—230 volts connected to said transformer, and regulating means having windings in series with said motor and with said lamps for compensating the voltage impressed on said lamps for current drawn by said motor.

6. In a regulator, a magnetic core, main motor and lamp windings upon two legs of said core respectively, auxiliary motor and lamp windings lying outside of and closely wound upon said main windings respectively, said auxiliary windings being connected together in opposition in a closed circuit, said auxiliary windings being of the ratio of the order of 25—43 turns to each other respectively and a pivoted switching arm for varying the effective ratio between said auxiliary windings, said main motor and lamp winding having an equal number of turns of the order of 25 turns.

7. In a regulator, a magnetic core, main windings upon two legs of said core, said main windings being each of the order of 25 turns, auxiliary windings lying outside of said main windings, said auxiliary windings being connected together in opposition in a closed circuit, said auxiliary windings being of the ratio of the order of 25—43 turns to each other, switching means for varying the effective ratio between said auxiliary windings, a resistance shunt for shunting one of the main windings and pivoted switching means for varying the effective value of said shunt.

8. In combination, a magnetic core, main windings upon two of the limbs of said core, auxiliary windings lying outside of said main windings and being connected together in opposition, a terminal board, switching means on said terminal board for varying the effective ratio between said auxiliary windings, a resistance shunt for part of the main winding, adjustable contact means having a pivoted switching arm supported on said board, said shunt being supported on said core and being controlled by said contact means, and an inclosing casing, for said windings and for said shunt.

9. In combination, a magnetic core, coils upon two of the limbs of said core, said coils comprising motor windings on one limb, lighting windings upon another limb, said motor windings and said lamp windings comprising a ratio of turns substantially 1 to 1, and comprising substantially 25 turns apiece, an auxiliary motor winding overlying said main motor winding and having substantially the same number of turns, an auxiliary lamp winding overlying said main lamp winding and having a substantially greater number of turns, said auxiliary winding being connected together in opposition and means to vary the effective number of turns of said auxiliary lamp winding so as to secure a ratio of lamp auxiliary turns to motor auxiliary turns of a general range lying between $\frac{43}{25}$ and unity.

10. In combination, a closed magnetic core having coils on two limbs thereof, said coils comprising a main motor winding, and a main lamp winding, said lamp winding being divided into two independent parts of equal number of turns, said motor windings comprising substantially 25 turns and said lamp windings together comprising substantially 25 turns, an auxiliary motor coil surrounding said main motor coil and comprising substantially 25 turns, an auxiliary lamp winding overlying said main lamp windings and comprising substantially 43 turns, a plurality of taps connected beginning with the 25th turn of the lamp auxiliary winding, a switching board supported upon said core, pivoted switching means on said board for selecting the desired tap and for connecting said auxiliary windings in opposition to each other, resistances for shunting said main lamp windings, switching means on said board for individually varying the resistance shunted across the lamp windings and connections between the resistance means, the switching means and the main lamp windings.

11. In combination, a magnetic core, coils upon opposite limbs of said core, a switching board clamped to said core and supported above the top of the same, a plurality of stationary contacts and a pivoted contacting finger for engaging one of said stationary contacts mounted on one end of said board, a group of contacts at the other end of said board and a pivoted contacting finger for selecting and engaging one of the contacts in the group, a pair of supporting arms depending from one edge of the board, a plurality of resistance members arranged in non-inductive relation and supported on said depending arms, said resistances being controlled by one of said contacting fingers and being normally connected across one of said coils.

12. In combination, a rectangular magnetic core having coils upon two of the limbs thereof, said coils comprising a main motor winding of substantially 25 turns, main lamp windings of substantially 25 turns, an auxiliary motor winding overlying said main motor winding and comprising substantially 25 turns, an auxiliary lamp winding overlying said main lamp winding and comprising substantially 43 turns and a plurality of taps connected to different parts of the auxiliary lamp winding from substantially the 25th turn to the 43rd turn, all of said windings comprising low resistance conductors of relatively large carrying capacity, the auxiliary windings being wound in close inductive relation upon the main windings respectively.

13. In combination, a casing, a magnetic core supported in said casing, said core having windings including a series lamp winding and a series motor winding, switching means supported within the casing for connecting part of the windings which are on the core in a closed circuit lying wholly within said casing and a rheostat having a resistance adapted to be connected in shunt of one of said series windings, said rheostat and resistance being mounted in said casing and supported on said core.

14. In combination, a casing, a magnetic core supported in said casing, said core having windings including a series lamp winding and a series motor winding, an insulating base mounted on said magnetic core, switching means supported on said base for connecting part of windings on said core in a closed circuit lying wholly within said casing, a pair of depending arms secured to said insulating base, resistances supported on said depending arms and switching contacts mounted on said board for connecting the resistances in shunt of one of the series windings.

In witness whereof I hereunto subscribe my name this 7th day of May, 1917.

EDMUND O. SCHWEITZER.